T. A. GALT & G. S. TRACY.
Corn-Planters.

No. 140,031.                      Patented June 17, 1873.

WITNESSES.
E. H. Bates.
George E. Upham.

INVENTORS.
Thomas A. Galt,
George S. Tracy,
Chipman Hosmer & Co.
Attys.

UNITED STATES PATENT OFFICE.

THOMAS A. GALT AND GEORGE S. TRACY, OF STERLING, ILLINOIS.

IMPROVEMENT IN CORN-PLANTERS.

Specification forming part of Letters Patent No. 140,031, dated June 17, 1873; application filed September 28, 1872.

*To all whom it may concern:*

Be it known that we, THOMAS A. GALT and GEORGE S. TRACY, of Sterling, in the county of Whitesides and State of Illinois, have invented a new and valuable Improvement in Corn-Planters; and we do hereby declare that the following is a full, clear, and exact description of the construction and operation of the same, reference being had to the annexed drawings making a part of this specification, and to the letters and figures of reference marked thereon.

Figure 1:
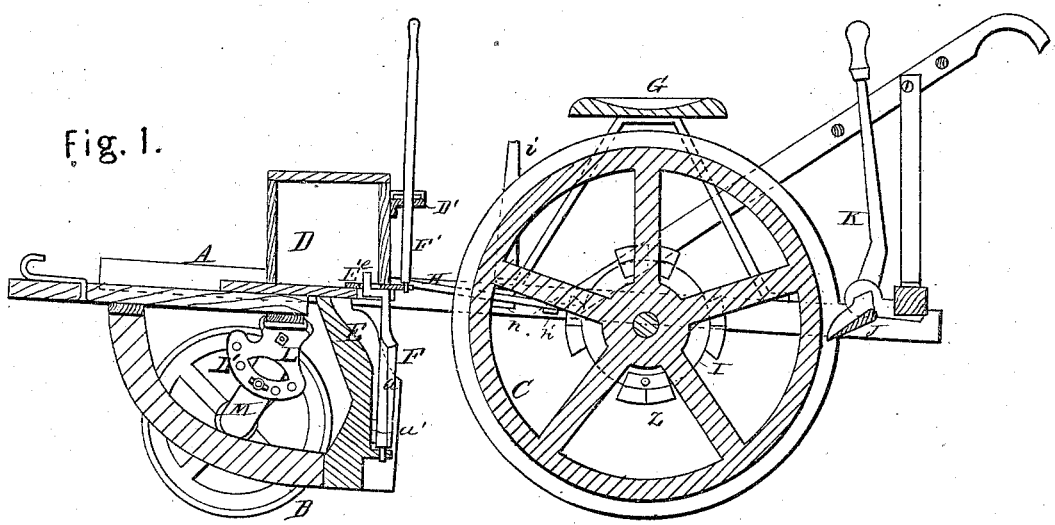
Figure 2:
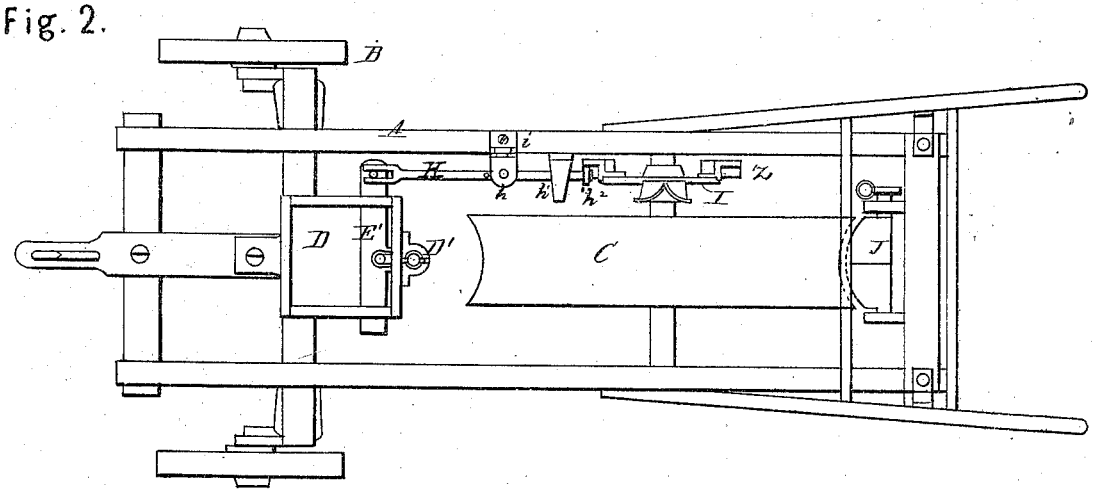

Figure 1 of the drawings is a representation of a sectional view of my invention. Fig. 2 is a plan view of the same.

This invention has relation to corn-planters and it consists in the construction and novel arrangement of devices for communicating reciprocating motion to the dropper, all substantially as hereinafter described.

Referring to the drawings, A designates the main frame of the implement, mounted on the small front wheels B and large roller C, the latter having a concave periphery. D represents the seed-box, E the seed-spout, and F the vertical pivoted corn-dropper, or valve, located within the spout, which has an open back, so that the operation of dropping may be seen by the driver or attendant. The valve is in the form of a vertical shaft having side wings $a$, and a channeled rib, $a'$. The corn falls into the spout through an opening in the bottom of the box D, and is deposited in proper quantities on each side of the projection. The dropper has a partial rotation, alternating in opposite directions, its upper end being provided with a crank, $e$, which is connected to a reciprocating slide, E'. F' designates a lever attached to said slide, located behind the box D, and pivoted to a bracket, D'. This lever is used when it is desired to manipulate the dropper by the driver. G designates the driver's or attendant's seat supported upon the frame A above the roller C, and so located in order that the operation of the dropper may be easily observed. H designates a connecting-rod, slotted at its forward end, and connected to one end of the slide E', and pivoted to a bracket or plate, $h$, attached to a lever, $i$, which, in turn, is pivoted to the main frame A. The lever H passes through a guide, $h^1$, and holds on its end a roller, $h^2$. Upon the shaft of the roller C is arranged a disk or wheel, I, armed with V-shaped projections or cams Z, projecting alternating from opposite sides of said wheel, and arranged with their points toward the wheel, as shown. The exterior surfaces of the wings of these projections are concave. Upon said surfaces the roller $h^2$ plays, and as the wheel I turns the projections Z vibrate the lever H, and give the slide E' a reciprocating movement which it transmits to the dropper. The lever $i$ is used in connecting and disconnecting the lever H and wheel I. J represents a scraper for the roller C, and K a lever for adjusting it. L denotes perforated plates, secured to the frame A and supporting the adjustable arms M holding the wheels B.

What we claim as our invention, and desire to secure by Letters Patent, is—

The combination of the slide E', slotted rod H, cam-wheel I, upright-lever $i$, and bracket $h$, pivoted to the middle portion of the rod H, substantially as and for the purpose set forth.

In testimony that we claim the above we have hereunto subscribed our names in the presence of two witnesses.

THOMAS A. GALT.
GEO. S. TRACY.

Witnesses:
JOHN PATTERSON,
ROBT. H. WILSON.